United States Patent [19]

Okada et al.

[11] Patent Number: 4,691,252

[45] Date of Patent: Sep. 1, 1987

[54] ROTARY MAGNETIC RECORDING-REPRODUCING APPARATUS

[75] Inventors: Kazuo Okada; Yoshiaki Nakayama, both of Tokyo, Japan

[73] Assignee: Fuji Photo Film Co., Ltd., Japan

[21] Appl. No.: 782,002

[22] Filed: Sep. 30, 1985

[30] Foreign Application Priority Data

Oct. 20, 1984 [JP] Japan ................... 59-206706

[51] Int. Cl.⁴ .................. G11B 21/02; G11B 21/08
[52] U.S. Cl. ........................ 360/75; 358/906; 358/909; 360/78
[58] Field of Search ............... 358/906, 909; 360/75, 360/78

[56] References Cited

U.S. PATENT DOCUMENTS

| 3,950,782 | 4/1976 | Carey et al. ............. 360/72.2 |
| 4,321,635 | 3/1982 | Tsuyuguchi ............. 360/72.2 |
| 4,531,163 | 7/1985 | Maerkl et al. ............. 360/49 |

FOREIGN PATENT DOCUMENTS

| 57-46353 | 3/1982 | Japan . |
| 58-83312 | 5/1983 | Japan ................... 360/78 |
| 58-98883 | 6/1983 | Japan . |
| 2083267 | 3/1982 | United Kingdom ........... 360/75 |

OTHER PUBLICATIONS

IBM Technical Disclosure Bulletin, vol. 18, No. 3, Aug. 1975, "Initial Program Load with Status Signaling by Disk Arm Motion".

Primary Examiner—George G. Stellar
Attorney, Agent, or Firm—Parkhurst & Oliff

[57] ABSTRACT

A magnetic recorder or reproducer in an electronic camera system wherein a subject is pure-electronically still-photographed and recorded on a rotating magnetic disc, and the reproducing of an image is carried out by a television system or a printer.

In this rotary magnetic recording-reproducing apparatus, the addressing of tracks is performed under two modes including absolute addresses and relative addresses, so that the most proper mode can be used in accordance with the purpose of use of the track addresses. Particularly, the adverse influence of a shift in the addressing due to a dropout can be eliminated and a shift in the numbering when the track number is displayed can be also eliminated.

6 Claims, 18 Drawing Figures

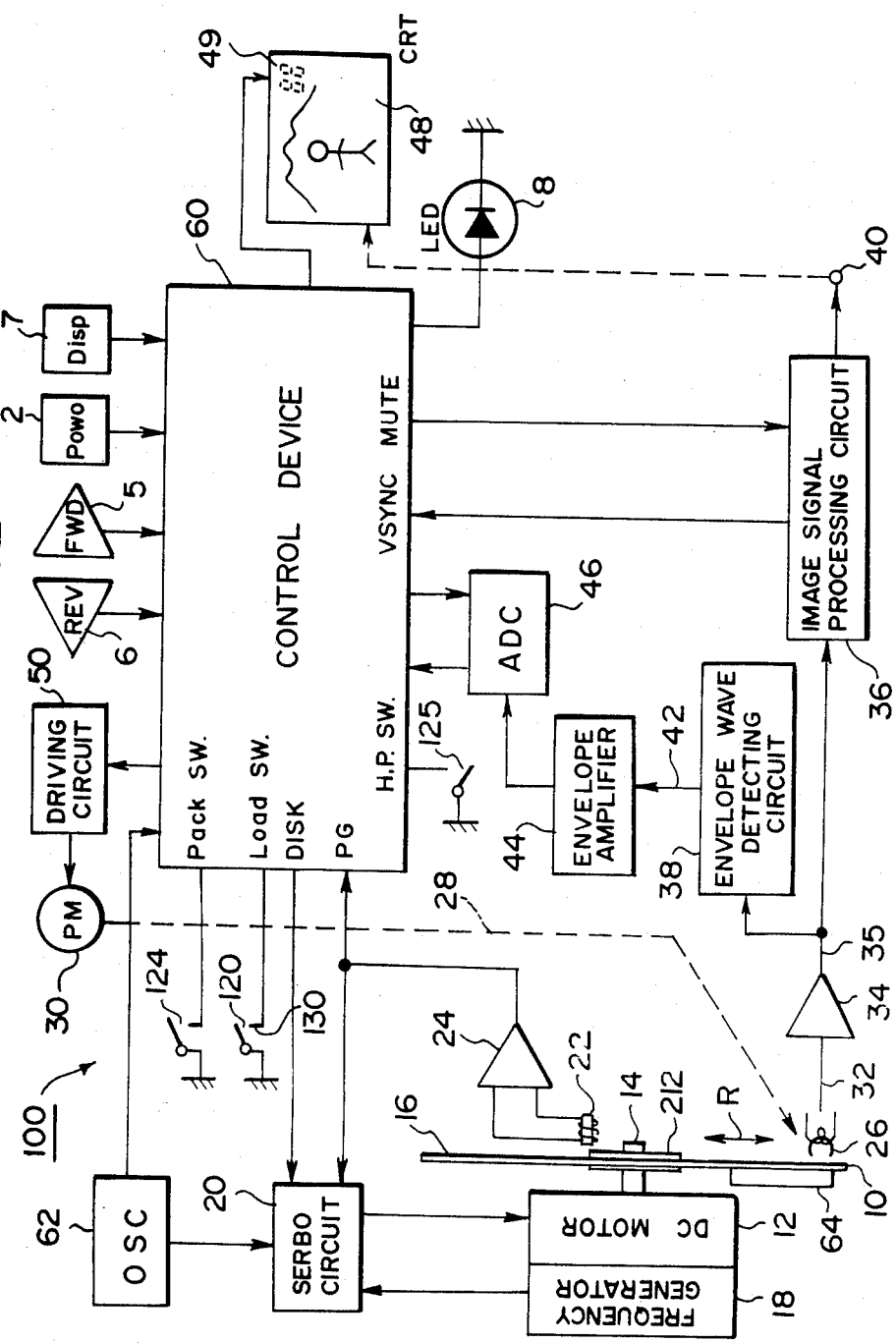

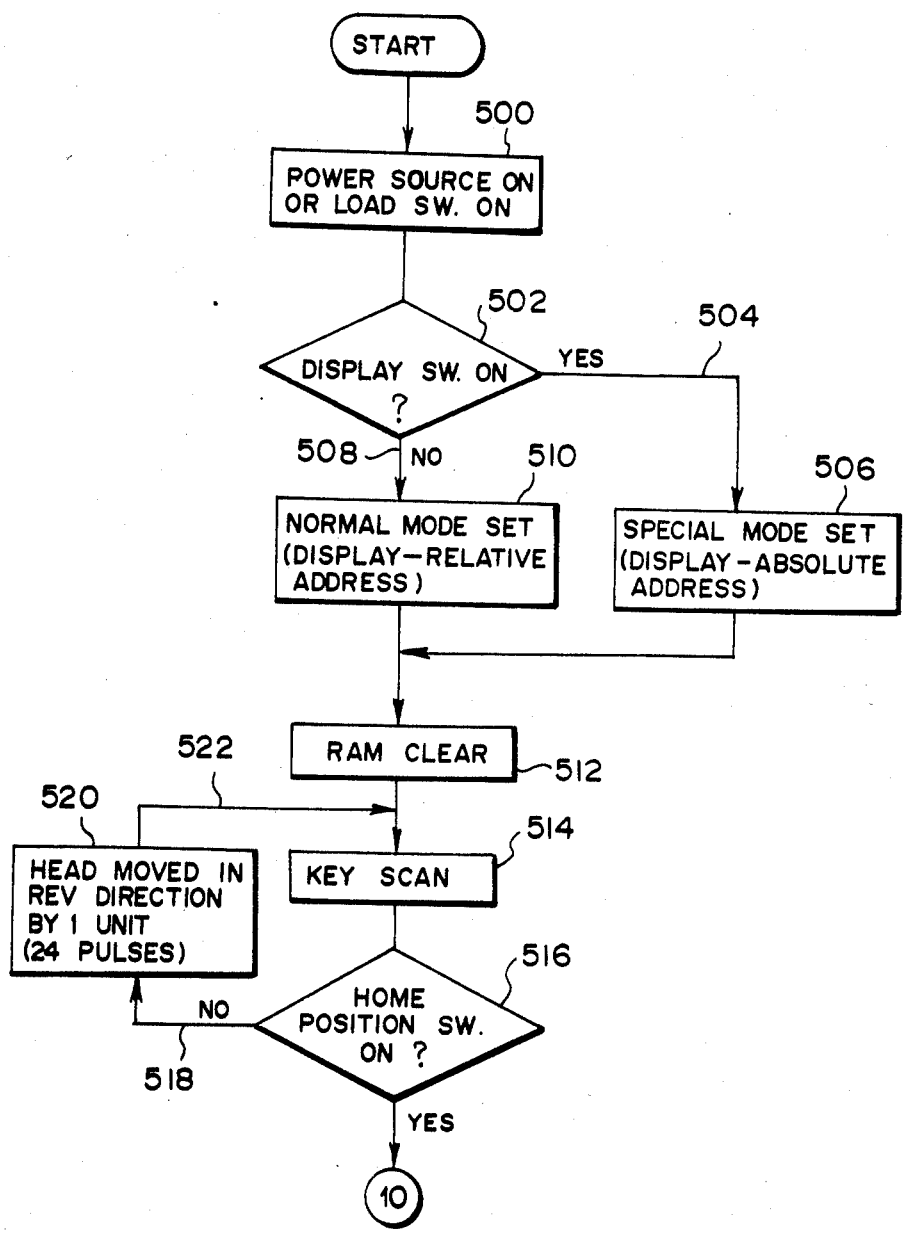

FIG. 8
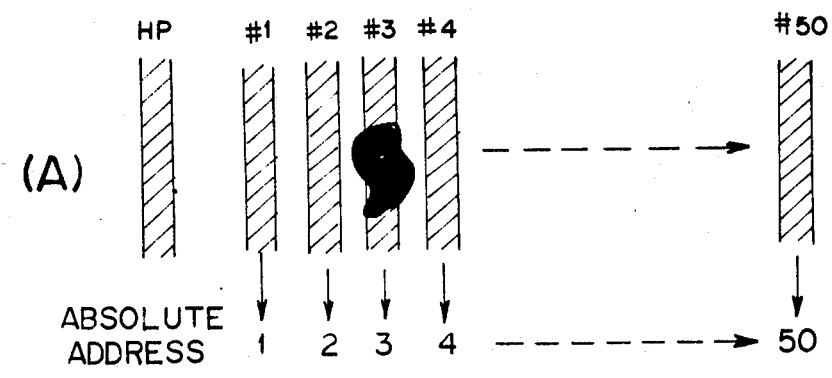
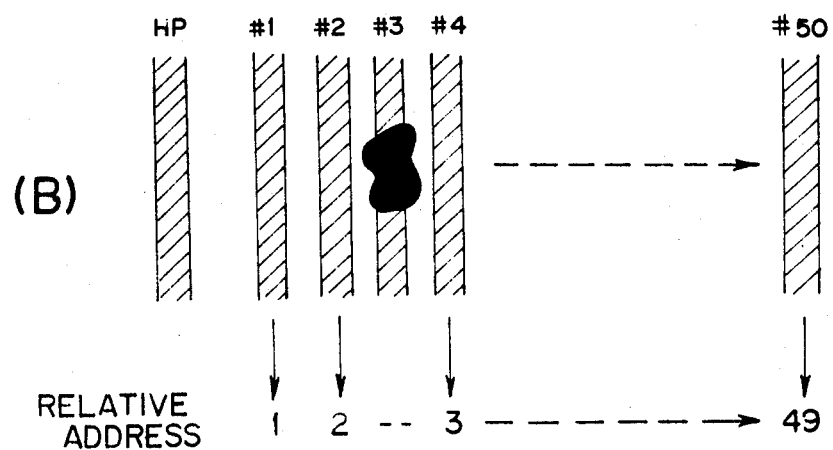

ROTARY MAGNETIC RECORDING-REPRODUCING APPARATUS

BACKGROUND OF THE INVENTION

1. Field of the Invention

This invention relates to a rotary magnetic recording-reproducing apparatus, and more particularly to a rotary-magnetic recording-reproducing apparatus for reproducing information recorded in a rotary magnetic recording medium such as a magnetic disc. Especially, this invention relates a rotary magnetic recording-reproducing appartus wherein information recorded on tracks formed concentrically on the magnetic disc is reproduced with a tracking servo being applied thereto.

2. Description of the Prior Art

Recently, there has been developed an electronic still camera system wherein an image pickup device such as a solid state image sensing device or an image pickup tube is combined with a recording device using an inexpensive magnetic disc as a recording medium and yet having a comparatively high memory capacity, a subject is stillphotographed purely electronically and recorded into a rotating magnetic disc, and the reproduction of an image is carried out by a television, a printer or the like, which are provided separately.

However, the recording medium used in the above-described magnetic recording, particularly, the magnetic disc tends to cause a tracking failure due to anisotropy, eccentricity, thermal expansion and the like. Consequently, there is such a disadvantage that a track adjacent a predetermined track is scanned during reproduction, whereby a crosstalk is caused.

To obviate this disadvantage, a tracking signal is recorded with a tracking servo being applied during recording of information, and during reproduction the tracking servo is applied by use of the tracking singnal. However, it is impracticable to provide a tracking servo mechanism requiring highly accurate control on a recording apparatus being compact in size and light in weight, such as a camera.

Firstly, there is such a method that, as the recording system, a guard band system or an FM azimuth system is adopted and the tracking failure occurring to some extent during reproduction is compensated in such a manner that a reproducing head does not scan the adjacent track and, even if the reproducing head scans, the reproducing head does not pick up a signal of the adjacent track.

Along with the above, a so-called peak searching system is used, wherein during recording a recording head is transferred at a predetermined track pitch by a stepping motor without the tracking servo being applied, during reproduction enveloped of output signals of respective tracks are detected, the optimal track is discriminated from a position of peak and the tracking servo is applied.

In the rotary magnetic recording used in the electronic still camera system, 50 tracks are recorded on a disc having a diameter as small as about 50 mm at a track pitch of about 100 $\mu$m, i.e. a track width of about 50~60 $\mu$m and a guard band width of about 50~40 $\mu$m for example. In the recording or reproducing apparatus, this magnetic disc rotated at a constant speed of 3000 rpm for example, and image signals are recorcded or reproduced at a field or frame speed.

The above-described compact magnetic disc being thin and having the small diameter is normally housed in a mold package (hereinafter referred to as a "disc pack") made of plastics, etc. for handling. Namely, each disc pack is loaded in a loading position of a recording or reproducing apparatus, whereby the magnetic disc, housed in the disc pack, is rotatably driven for recording or reproduction.

Now, in the rotary magnetic recording-reproducing appratus, it is necessary to display a track number upon completion of the tracking on each of the tracks. In such a case as described above, the handling of the tracks matters when there is a dropout track or an unrecorded track. In the rotary magnetic recording-reproducing apparatus, if the dropout of a signal occurs in a track of the magnetic disc for example, the track may be skipped and the succeeding perfect track may be recorded. In other words, in the reproducing apparatus wherein a track number is discriminated simply on the basis of the transferred distance of the reproducing head, even a defective track, in which no image signal is recorded, is discriminated as if an effective track and the track number thereof is displayed. In consequence, inconvenience may occur in the operation of such a reproducing apparatus that an image of a desirable frame number is to be rapidly selected and displayed. Namely, in the case of users, it suffices to number-display the recorded tracks successively. Reproduced images can be displayed on the display screen in accordance with the number displays, thus enabling to avoid giving a feeling of disorder to the users.

However, if all of the handlings are made by such an addressing as described above, namely, skipping the defective tracks, the following disadvantage will be presented. Namely, in the reproducing apparatus of the type wherein the reproduction is performed with the unrecorded track or tracks being skipped, such a disadvantage may be presented that, when it is desired to know what is recorded in a certain track irrespective of the quality of the record to some extent or when it is desired to know as to whether a certain track is judged as an unrecorded track and skipped because of a defectively recorded state of something or of no recording being made entirely, the track cannot be observed.

SUMMARY OF THE INVENTION

The present invention has been developed to obviate the disadvantages of the prior art and has as its object the provision of a rotary magnetic recording-reproducing apparatus wherein the addressing of tracks provided on a rotary magnetic recording medium is set in a plurality of modes in accordance with the uses.

To this end, the present invention contemplates that, in a rotary magnetic recording-reproducing apparatus including: a magnetic head for reading signals from a plurality of tracks each formed into a locus in which relative positions of a leading end and a tail end of a recording coincide with each other on a rotary magnetic recording medium; head moving means for transferring the magnetic head onto a desirable one of the tracks; and control means for controlling the head moving means to make the tracking on an aimed track; the apparatus further includes address setting means wherein absolute addresses and relative addresses are simultaneously used to make the addressing from the first track to the final track.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 2 is a block diagram showing the circuit arrangement of the rotary magnetic recording-reproducing apparatus according to the present invention;

FIGS. 7A to 7E are flow charts showing sub-routines of the control device;

FIG. 8A is a explanatory views showing absolute addresses; and

FIG. 8B is a explanatory views showing relative adresses.

DETAILED DESCRIPTION OF THE INVENTION

Detailed description will hereunder be given of the preferred embodiment of the rotary magnetic recording-reproducing appratus according to the present invention with reference to the accompanying drawings.

Figure 1:
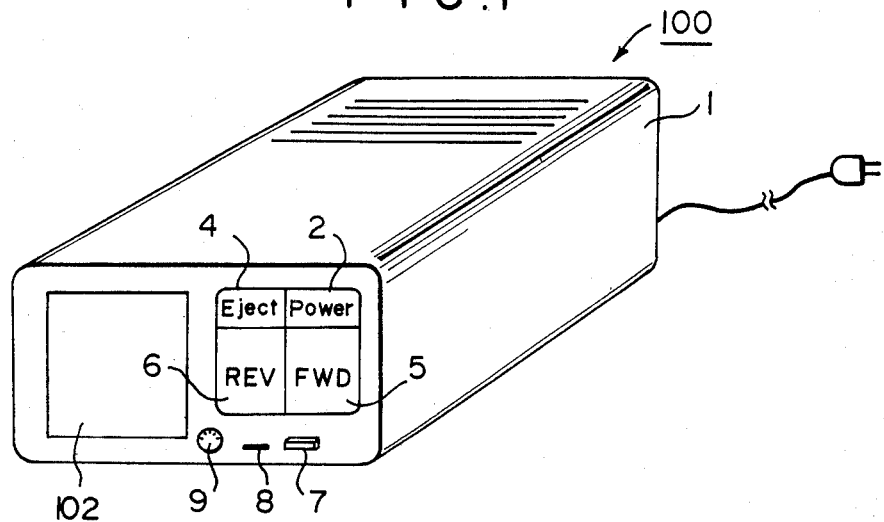
FIG. 1 is arrangement drawing showing the outer appearance of the rotary magnetic recording-reproducing apparatus according to the present invention.

FIG. 1 shows an arrangement drawing showing the outer appearance of the rotary magnetic recording-reproducing apparatus 100 according to the present invention. Referring to FIG. 1, designated at 1 is a casing, 2 a power source switch, 4 an eject switch, 5 a forward switch for feeding the magnetic head in the forward direction, 6 a reverse switch for feeding the magnetic head in the reverse direction, and 7 a track number display switch for showing that in which track on the magnetic disk the magnetic head is positioned. Furthermore, denoted at 8 is a warning lamp formed of a LED (light emitting diode) or the like, 9 a connector for remote control and 102 a bucket to be opened by the eject swith 4.

FIG. 2 shows the circuit arrangement of the apparatus of this embodiment illustrated in FIG. 1, wherein a rotary recording medium 10, such as for example a magnetic disc, is detachably mounted to a spindle 14 driver by a DC (direct current) motor 12. In this embodiment, the magnetic disc 10 has a sheet of a magnetic recording material having a diameter of about 50 mm. Recorded on a recording surface 16 are a plurality of, such for example as 50, recording tracks on concentric circles at a pitch of about 100 μm for example. In this embodiment, signals recorded on the recording tracks are image signals, which may be color image signals FM modulated from brightness signals and chrominance signals for example. This image signal may be a field image signal forming a field of image through raster scanning, which is recorded on each of the tracks.

The DC motor 12 has a frequency generator 18 generating AC (alternating current) frequency signals, receives power supply from a power source through a servo circuit 20 and servo-controlled in such a manner that the disc 10 is rotated at a predetermined speed of rotation, e.g. a constant speed of 3600 rpm. The servo circuit 20 is connected to a control device 60 for controlling the apparatus as a whole. The control device 60 is operated in accordance with a signal disc to control the rotatable driving and stop of the disc 10.

A phase generator 22 is provided at a position close to the recording surface 16 of the disc 10 and connected to the servo circuit 20 and the control device 60 through an amplifier 24. With this arrangement, a timing mark formed as opposed to a predetermined position on the recording surface 16 is detected, and timing pulses PG are formed.

A magnetic transducer, i.e. magnetic head 26 is provided on the recording suface 16 and carried by a supporting mechanism 28. As conceptually indicated by a broken line 28, this supporting mechanism is driven by a step motor (PM) 30, moves the magnetic head 26 along the recording surface 16 in opposite radial directions as indicated by a double-headed arrow R, and can select an optional track on the recording surface 16.

The magnetic head 26 may have a magnetic recording function, however, in this embodiment, such a magnetic head is exemplified which has a reproducing function of detecting an image signal from a track which has been recorded on the recording surface 16 and transducing the same into an electrnic signal associated therewith. In this embodiment, as described above, the disc 10 is rotated at the constant speed of 3 600 rpm, whereby an image signal for one track, i.e. FM modulated image signal of one field is reproduced by the magnetic head 26 every 1/60 SEC, per turn. This means that the demodulation of the image signal makes it possible that this embodiment becomes compatible with a standard color television system such as the NTSC (National television system committee) system.

A reproducing output 32 of the magnetic head 26 is connected to an image signal processing circuit 36 and an envelope wave detecting circuit 38 through a preamplifier 34. The image signal processing circuit 36 is such a circuit that an image signal detected by the head 26 is signal-processed and the signal thus processed is outputted to an apparatus output 40 as a composite color image signal of a NTSC format. The processing circuit 36 has functions of demodulating this signal, extracting a vertical synchronizing signal VSYNC from the composite color image signal of the NTSC format and feeding the same to the control device 60. Furthermore, the processing circuit 36 receives a signal MUTE from the control device 60 and converts and effective horizontal scanning time duration of the image signal into a blank signal, thereby performing a muting operation. It is not essential for this apparatus to have a function of converting the image signal into the standard format, and the processing circuit 36 may have the function of synchronous extraction from the image signal sensed by the head 26 and the function of outputting the same to a terminal 40 simply by the control device 60.

The envelope wave detecting circuit 38 is such a wave detecting circuit which detects an envelope of the FM modulated image signal recorded on a track of the recording surface 16 and outputs a voltage commensurate thereto to an output 42. This ciruit 38 is connected to an analogue-digital converter (ADC) 46 through an envelope amplifier 44. In this embodiment, the ADC 46 has a quantization leved of 256 and outputs to the control device 60 as data to eight bits at request of the control device 60.

As will be described in detail hereunder, the control device 60 is such a control device which generalizes the control of this apparatus as a whole under the opration of the operator and is advantageously constituted by a micro procesor system for example.

As described above, this embodiment includes the power source switch 2, the forward key FWD 5 for transferring the head 26 in the forward direction of the track number (for example, from a track disposed at the outer side to another track disposed at the inner side) and the reverse key REV 6 for transferring the head 26 in the reverse direction, and all of which are connected to the control device 60. The track number 49, where the magnetic head, which has been fed by the key FWD 5 or REV 6, is positioned, is visibly displayed on an indicator 48 such as a CRT display or the like by a superimposer, etc. having an oscillator, not shown, connected to the control device 60. The track number 49 may be displayed on an indicator provided independently of the indicator 48 but not on the indicator 48.

In this embodiment, the step motor 30 is a pulse operated motor of four phase driving, and rotated through about 15° per driving pulse. In consequence, the step motor 30 makes one turn by 24 pulses. The head supporting mechanism 28 is constructed such that the head 26 is transferred by about 4.2 μm in a direction indicated by the arrow R by one pulse fed to the step motor 30. A time duration of excitation for one pulse is about 2~3 millisec for example. In consequence, the head 26 is transferred about 100 μm by 24 pulses.

These driving pulses are fed from a driving circuit 50 comprising a current amplifier, and the driving circuit 50 produces excitation coil drivng pulses of the step motor 30 in accordance with an excitation pattern instructed by the control device 60.

The control device 60 and the servo circuit 20 are operated in accordance with a standard clock generated by an oscillator of standard clock (OSC) 62. In this embodiment, the servo circuit 20 is bed thereto with a standard signal of 60 Hz equal to the field frequency of the raster scanning image signal recorded in the magnetic disc 10, and the control device 60 is fed thereto with a clock of as high as 3.58 MHz for example.

Figure 3:
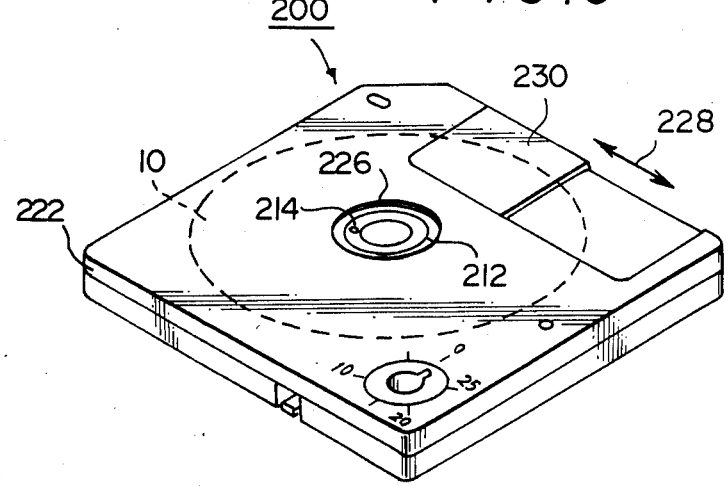
FIG. 3 is a perspective view showing an example of the magnetic disc pack usable in the apparatus shown in FIG. 1.

FIG. 3 shows a magnetic disc pack 200 used in this embodiment. This disc pack 200 has a casing 222 rotatably receiving therein the magnetic disc 10 being thin and having a small diameter, for the image signal. Provided substantially at the center of the casing 222 is a circular opeing 226, through which is exposed a hub or a core formed at the center of the magnetic disc 10. A positon of a core 212 is provided with a magnetic material 214 for exciting the coil 22 of the phase generator.

When the disc pack 200 is mounted to a magnetic recording apparatus 100, the forward end portion of the spindle 14 thereof is chucked by the core 212, so that the magnetic disc 10 can be rotated in the disc pack 200.

The disc pack 200 is provided with a shutter 230 movable in directions in paralled to one side of the disc pack 200 as indicated by a double-headed arrow 228. When this shutter 230 is moved to a position opposite to the position as shown, an opening of the casing 222 disposed thereunder is exposed, so that an adjusting plate 64 and the magnetic head 26 of the reproducing apparatus 100 can be approached or abutted against the magnetic disc 10.

Figure 4A:
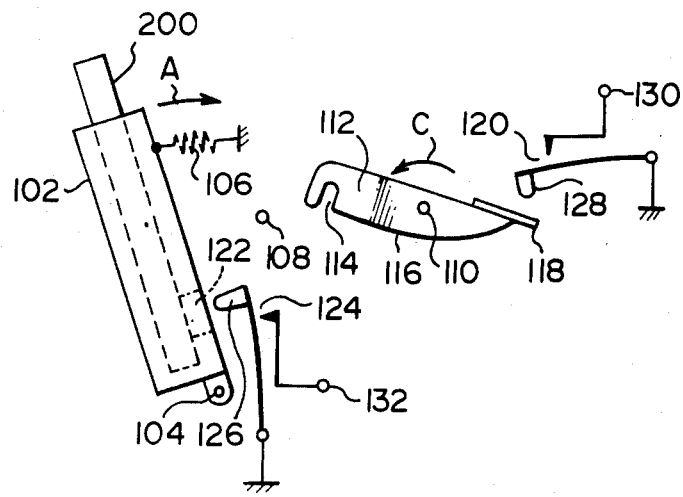
FIGS. 4A and 4B are explanatory views showing the portion for loading the disc pack of this apparatus.

As shown in FIG. 4A, the disc pack 200 receiving therein the disc 10 is inserted into a bucket 102 thereof in order to be loaded in this apparatus 100. Tht bucket 102 detachably receives therein the disc pack 200 and holds the same, and supported in the casing 1 of this apparatus 100 in a manner to be rotatable about an intersection 104. The bucket 102 is normally biased by biasing means 106 in a direction opposite to direction indicated by an arrow A, so that the disc pack 200 can be taken out of the bucket 102 at a position shown in FIG. 4A.

Figure 4B:
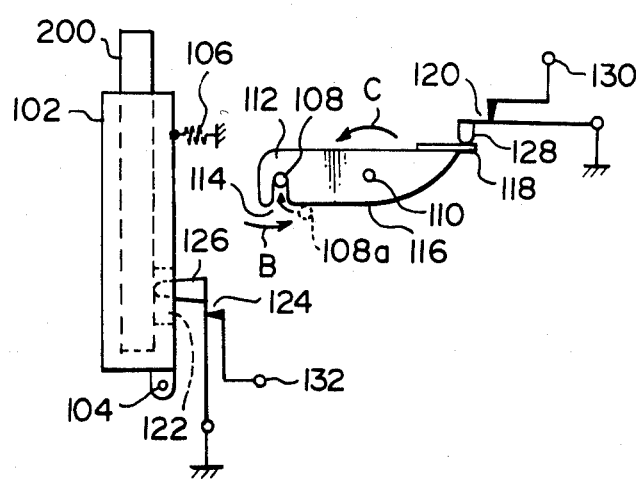

When the disc pack 200 is inserted into the bucket 102 and the bucket 102 is pushed in the direction indicated by the arrow A, an engageable member 108 is operated in association therewith, the bucket 102 slides in a direction indicated by an arrow B on one side 116 of an arm 112 rotatable about a fulcrum 110 in a direction indicated by an arrow C by being biased as shown in FIG. 4B, and moves to a position indicated by a broken line 108a. Then, when the hand is removed from the bucket 102, the bucket 102 is brought into an accurate boading position by the biasing pressure of biasing means 106, and the engageable member 108 is received into an engageable groove 114 formed at the forward end of the arm 112 to be engaged therewith.

At this time, the core 212 of the disc 10 accurately chucks the spindle 14.

In this state, a pressing portion 118 disposed at the other end of the arm 112 presses a projection 128 of a normalyopen contact point 120 to close the same. Namely, the contact point 120 is closed only when the bucket 153 is in the normally loaded state. As shown in FIG. 2, an output terminal 130 is connected to the control device 60, so that the control device 60 can detect wheter the disc pack 200 is normally loaded or not. As described above, the contact point 120 consitutes a load switch shown in FIG. 2.

Furthermore, the bucket 102, is formed at the lower portion thereof with an opening 122 as indicated by broken lines. Therefore, when the bucket 102 comes to the normal loaded position, a projection 126 of a normally-open contact point 124 enters the opeing 122 and abuts against the disc pack 200, whereby the disc pack 200 is pressed to close the contact point 124. If the disc pack 200 is not inserted into the bucket 102 in the normal state, the contact point 124 is not closed. As shown in FIG. 1, an output terminal 132 of the contact point 124 is connected to the control device 60, so that the control device 60 can detect the presence of the disc pack 200. As described above, the contact point 124 constitutes a pack switch shwon in FIG. 2.

Figure 5:
FIG. 5 is an explanatory view showing the arrangement of the tracks in the magnetic disc applicable to this apparatus.

As shown in FIG. 5, in this embodiment, respective tracks of the magnetic disc 16 are arranged from a junior number at the outside to a senior number at the inside, whereby the home position HP, i.e. a returning initial position of the magnetic head 26 is set at a position outwardly of the track No. 1 disposed at the outermost side. Selection of a track or control of tracking is performed as referenced from this reference position, i.e. the returning initial position HP and by counting the number of tracks, i.e the number of peakes of the envelope, as the head is transferred.

An address is given to each of the tracks No. 1 to No. 50 whereby the movement of the magnetic head is controlled. The addresses are set for control as described above, so that necessity of making the mechanical pursuit of the track is eliminated, thus enabling to reduce the number of parts. The method of setting the addresses includes two systems including a relative address system and an absolute address system. Normally, the control is carried out by use of the relative addresses, and not normally, the control is carried out by use of the absolute addresses. In consequence, the both systems of address setting are used simultaneously.

As shown in FIG. 8(A), according to the absolute address setting, the initial No.1 track contiguous to the head position (HP) is made to be the address 1, and thereafter, addresses by consecutive numbering are successively given up to No. 50. Since these addresses correspond to the tracks No. 1 to No. 50 in a ratio of one to one, the envelope detection signals obtainable during tracking cannot be utilized. Because of this, the number of pulse signals for driving the pulse motor (PM) 30 is counted, to thereby enable to index the number of addresses.

On the other hand, as shown in FIG. 8(B), according to the relative address setting, the address 1 is set to No. 1 track. However, in the case where the magnetic head 26 makes the tracking of the tracks successively, when No. 3 track is dropped, as shown, for example, the succeeding No. 4 track is set to address 3. In consequence, should no drop occur, the absolute addresses coincide with the relative addresses.

The following is the tracking by a peak searching control. Firstly, assumption is made that the magnetic head 26 has been located on a track. When the key FWD 5 or the key REV 6 is operated, the control device 60 starts the step motor 30 through the driving circuit 50 to thereby transfer the magnetic head 26 in the forward or reverse direction.

In this embodiment, in the first place, the magnetic head 26 is transferred a distance slightly shorter than a pitch between tracks of 100 μm, e.g. a distance for 23 pulses, i.e. about 96 μm in the forward or reverse direction. As this time, as for the signal read by the magnetic head 26, an envelope is wave-detected by the envelope wave detecting circut 38 and inputted to the control device 60 as digital data from the ADC 46. Then, the control device 60 further transfers the head 26 by one pulse, and the level of a signal detected from the magnetic head 26 then is compared with that of the preceding envelope.

While tranferring the head 26 as described above, the control device 60 detects and compares the envelope level each time and judges the position of the peak of the envelope. The position of the head where the peak is detected is a position of an accurate on-track. Thus, the control device 60 performs the peak searching tracking.

In order to rapidly one-track the head at a normal track position during the peak searching track, it is desirable that the magnetic head 26 is returned to the returning intial position HP at least before the start of tracking.

Figure 6A:
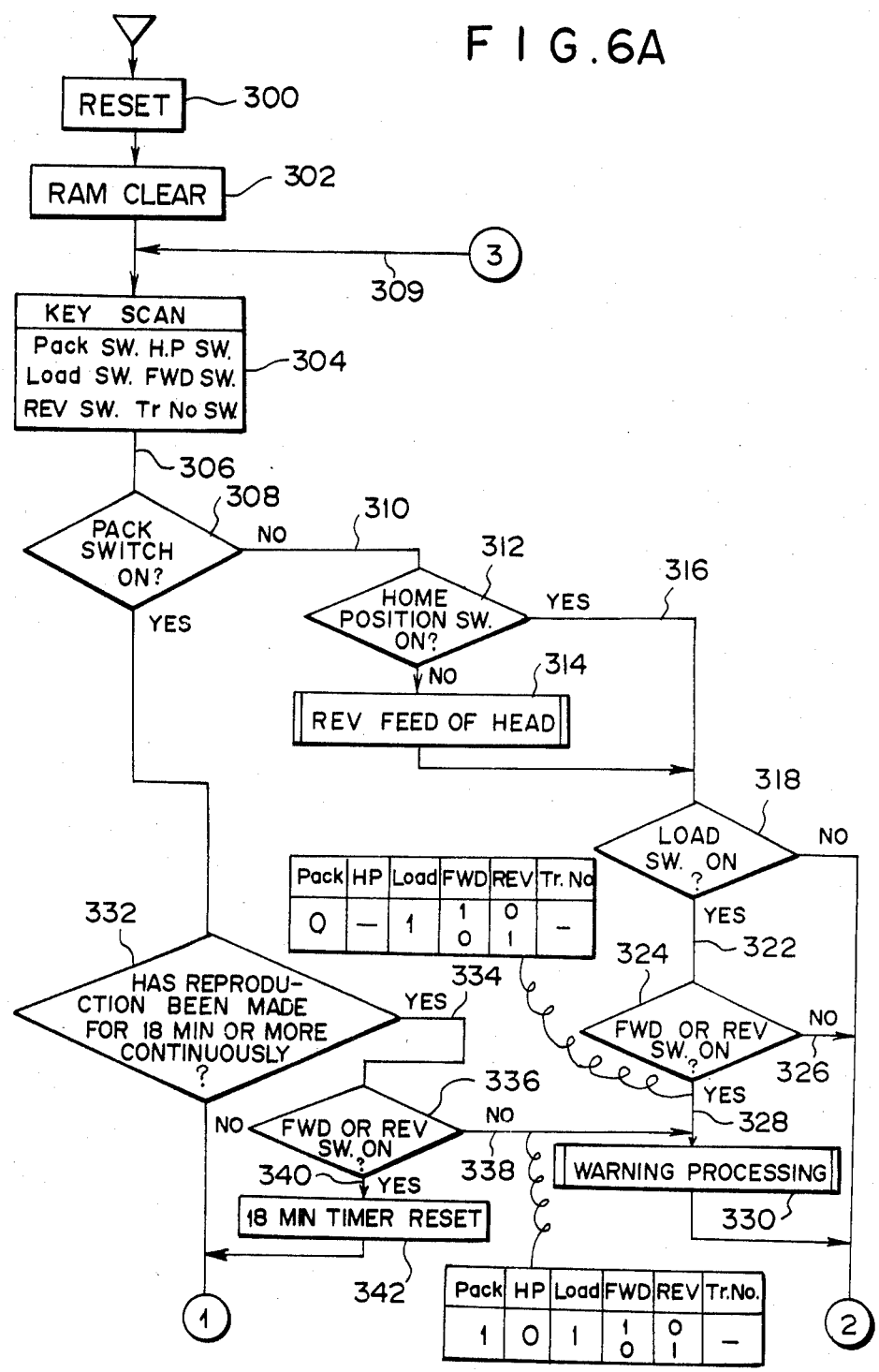
FIGS. 6A to 6E are flow charts showing examples of operation flows of the control device shown in FIG. 2.
Figure 6B:
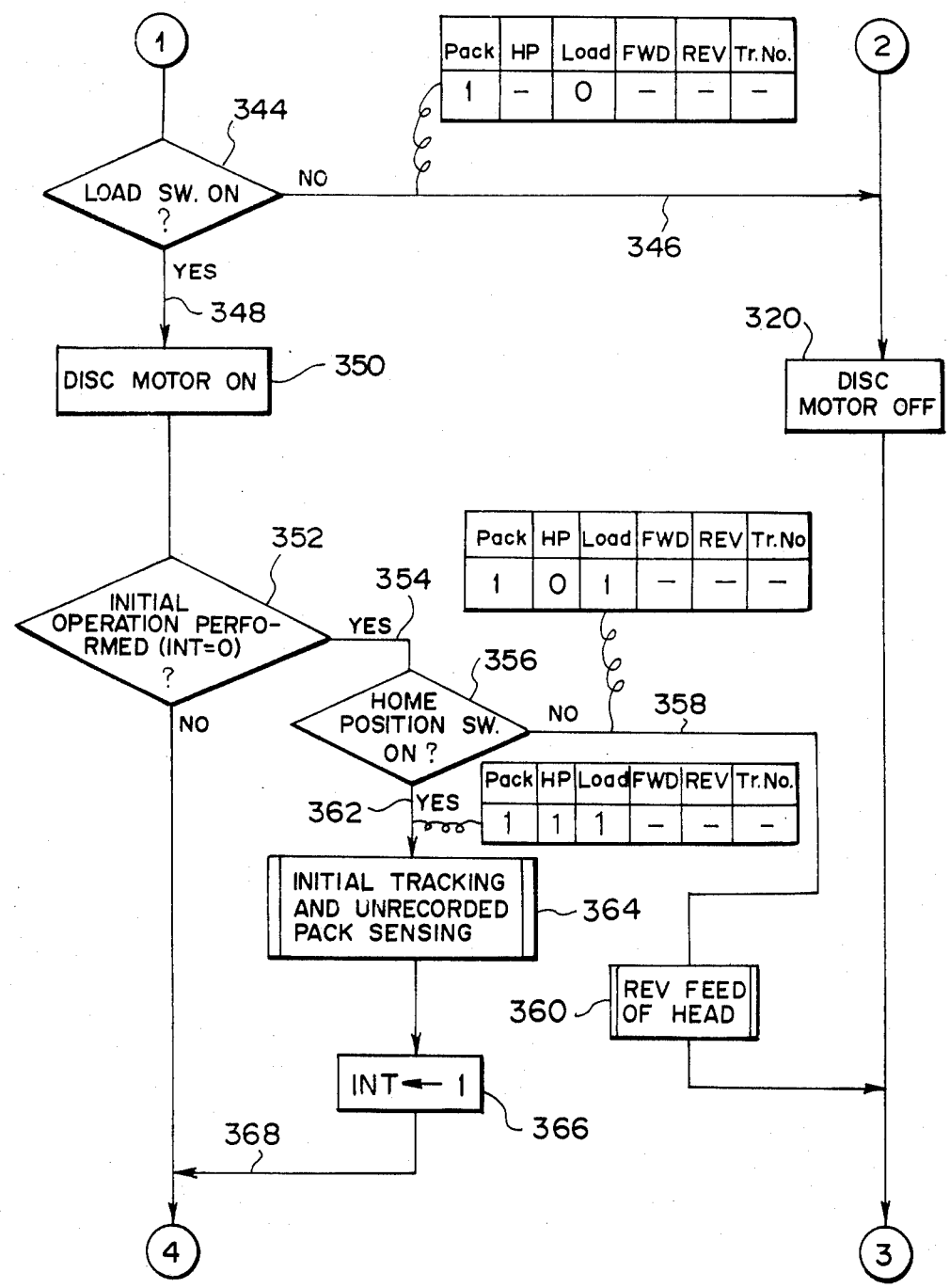
Figure 6C:
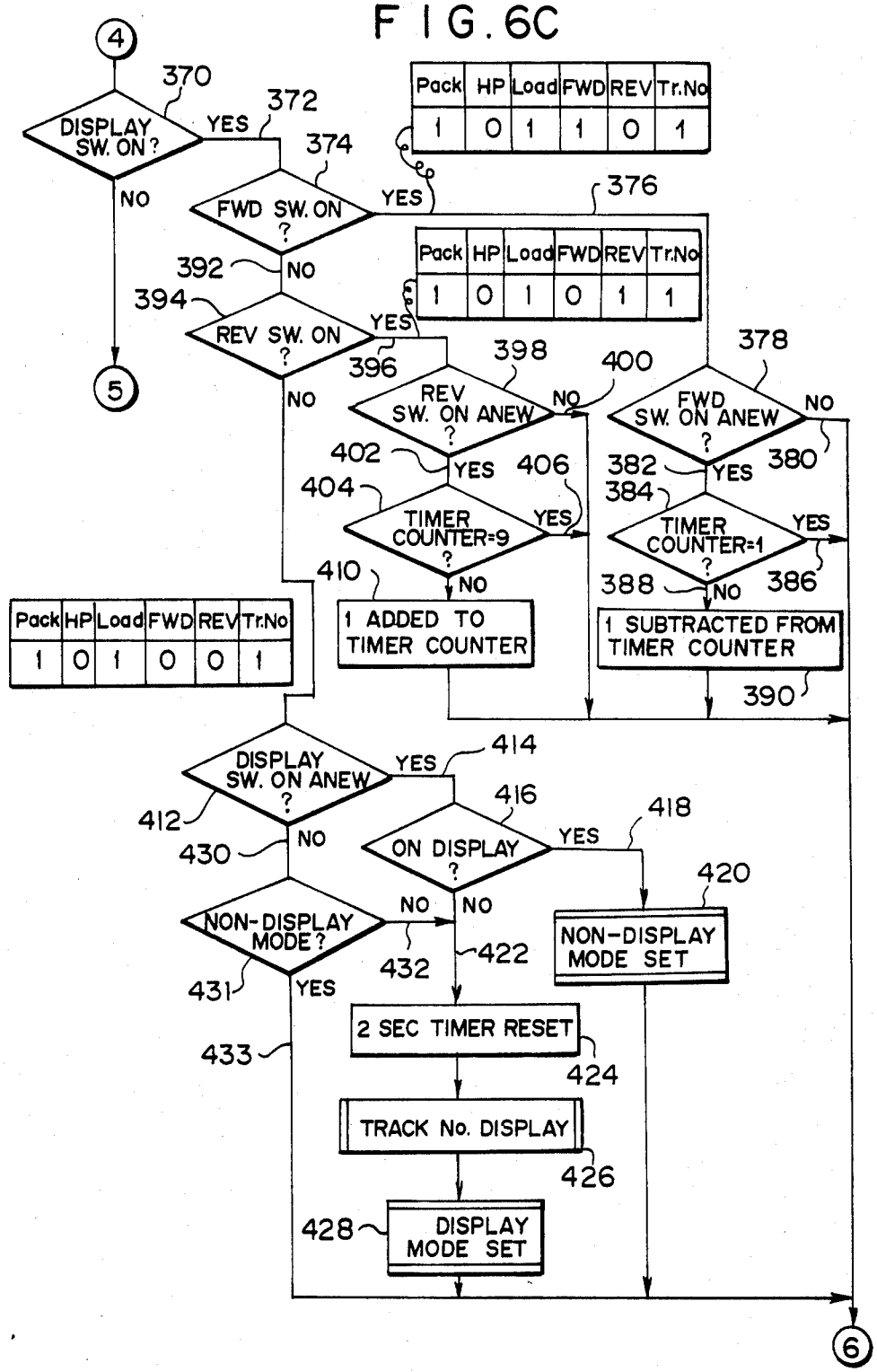
Figure 6D:
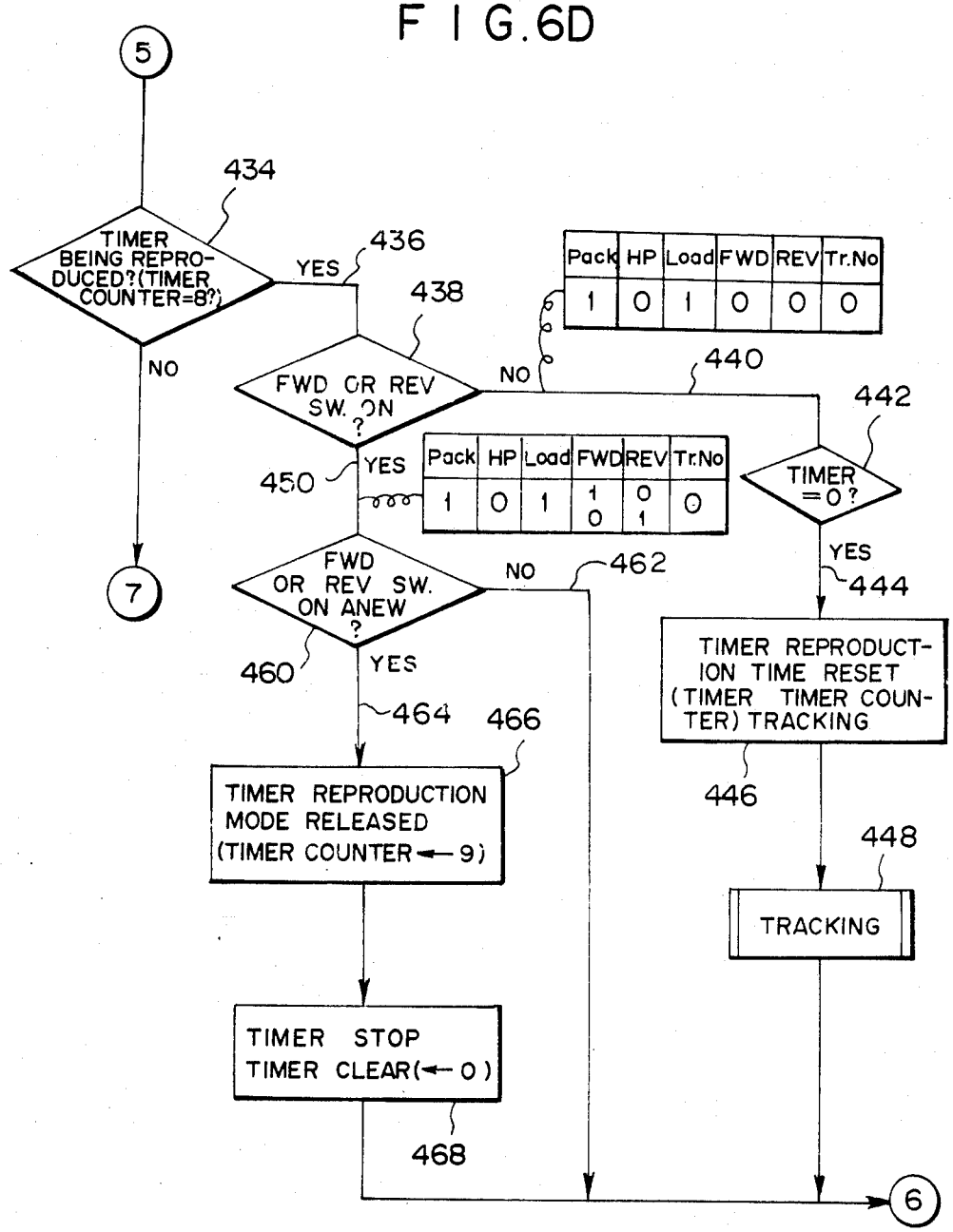
Figure 6E:
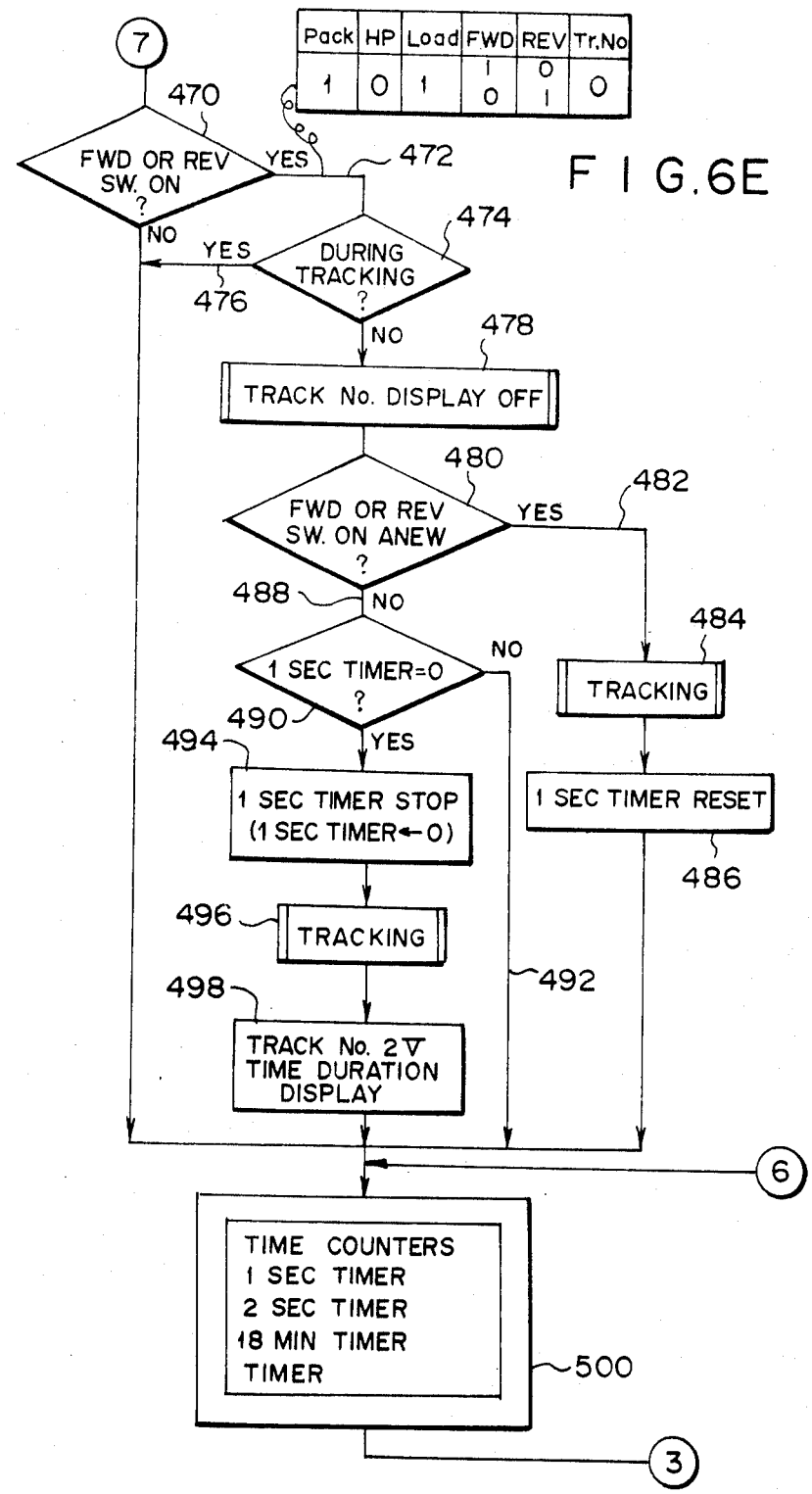

FIGS. 6A and 6E are flow charts showing the control due to the switch operations of the respective sections according to the present invention. (Additionally, the numerals in the parentheses indicate the step numbers or processing rotes). When the power switch 2 is turned on firstly, reset is made (300), and the contents of memory which have been accumulated so far are cleared due to RAM clear (302). Subsequently, six switches, i.e. the pack switch (Pack SW) 124, home position switch (HP.SW) 125, load switch (Load SW) 120, forward switch (Fwd SW)5, reverse switch (Rev SW) 6 and track number switch (Tr No.SW) 7 are scanned at pulses of 1v by key scan (304). More specifically, the pulses of 1v scans the routines from flow 306 to flow 309 at a cycle of 1/20 sec, to thereby grasp the on-off operations of the above-described six keys at every 1/60 sec.

Description will hereunder be given of the warning processing when the forward button 5 or the reverse button 6 is pressed with the magnetic disc pack 200 being not mounted to the main body of apparatus. Firstly, when the pack switch 124 is judged to be off by the key scan started from Step 304 (310) in Step 308, judgment is made as to whether the home position switch is on or not in Step 312. Since the head 26 is not yet returned to the starting end position (HP position) when the home position switch 125 is off, the head 26 is fed in the reverse direction toward the home position switch by the reverse feed of the head (314). When the head 26 reaches the home position, judgment obtained by the key scan in Step 312 is that the home position switch 125 is on (316), and subsequently, in Step 318, judgment is made as to whether the bucket is closed at the normal position or not, namely, whether the load switch 120 is on or not. When the load switch 120 is not on, the disc motor 12 stops (320) as shown in FIG. 6B, and the flow is returned to the original routine. Subsequently, when the bucket 102 is closed at the normal position, namely, the load switch is turned on (322), judgment is made whether the forward switch 5 or the reverse switch 6 is on or not in Step 324. When it is judged that the forward switch 5 and the reverse switch 6 are off (326), the disc motor 12 stops (320) and the flow is returned to the original routine. Subsequently, when it is judged that the forward switch 5 or the reverse switch 6 is on (328) in Step 324, the rotary magnetic recording-reproducing apparatus gives a warning (330). The logical conditions of the switches in the flow 328 are shown below. (Hereinafter, similarly, descriptions will be successively made in FIGS. 6A to 6E)

| Pack | HP | Load | FWD | REV | TR No. | DISPLAY |
|------|----|----|-----|-----|--------|---------|
| 0    | —  | 1  | 1   | 0   |        | —       |
|      |    |    | 0   | 1   |        |         |

This warning processing may have various modes. For stance, a LED warning lamp 8 may be turned on, the screen may be flashingly displayed, a number display may be flashingly displayed, and a waring sound may be issued. Or, the bucket 102 may be opened to inform the operator of an unloaded state. During this waring processing (330), the disc motor 12 is stopped (320). As explained above, when the forward switch 5 or the reverse switch 6 is pressed in the state where the disc pack 200 is not inserted into the bucket 102, the warning is given. In consequence, the magnetic head 26 is not moved when the pack is not inserted.

Next, in the rotary magnetic recording-reproducing apparatus according to the present invention, when the magnetic head 26 is positioned in one and the same track of the magnetic disc continuously for 18 min, a warning is issued, whereby the magnetic disc is automatically stopped or the magnetic head 26 is shunted to the outside of the recording region. Description will now be given of this warning processing. Firstly, in Step 332 of FIG. 6A, when it is judged that the magnetic head 26 is reproducing continuously for 18 min on one and the same track by that a 18 minute timer is set at zero (334), judgment is made as to whether the forward switch 5 or the reverse swtich 6 is on or not in Step 336. When it is judged that the forward switch 5 or the reverse switch 6 is off (338) in Step 336, the warning processing 330 similar to the one as explained above is performed. When the operator is informed of an abnormal condition by the above-described warning processing 330 and turns on the forward switch 5 or the reverse switch 6 (340), the 18 minute timer is reset, and the flow scans the original routine again. In the rotary magnetic recording-reproducing apparatus, when the magnetic head is positioned on one and the same track 18 min or more, a warning is issued to inform the operator of an abnormal condition, whereby the magnetic disc is automatically stopped or the magnetic head is shunted to the outside of the recording region, so that the tracks of the magnetic disc can aboid being damaged.

Subsequently, when it is judged that the bucket 102 is not closed at the normal position in Step 344 of FIG. 6B (346), the disc motor 12 remains stopped (320).

Furthermore, when it is judged that the bucket 102 is closed at the normal position (348) in Step 334, the disc motor 12 is rotated (350).

Next, in the rotary magnetic recording-reproducing apparatus according to the present invention, the initial operation to be described hereunder will be performed. More specifically, when it is judged that the initial operation is performed in Step 352, i.e. the flag is zero (354), judgment is made as to whether the home position switch is on or not in Step 356. When it is judged that the home position switch is off (358) in Step 356, the magnetic head 26 is fed in the reverse direction (360) and transferred toward the home position switch 125. When, before long, the magnetic head 26 is positioned at the home position and it is judged that the home position switch 25 is on (362) in Step 356, the routine proceeds to Step 364 where the initial tracking operation (or sensing of an unrecorded pack) is performed. In Step 364 where the initial tracking operation is performed, the first track is sought by the peak searching tracking operation, and, when this initial tracking operation is completed, a flat INT showing the state of having processed the initializing is set at 1 (366). The flow which has set the flat INT at 1 is returned to the original routine again, and in Step 352, the routine directly proceeds to Step 370 of FIG. 6C, so that the routine of the initial operation is not scanned by the succeeding key scan. Furthermore, in the rotary magnetic recording-reproducing apparatus, in the Step 364 where the initial tracking scanning is performed, the operation of sensing the unrecorded pack is performed. More specifically, when an user of the rotary magnetic recordingreproducing apparatus inserts the unrecorded pack by mistake, the magnetic head 26 searches all of the tracks, and, when it is judged that the recording track is not present, a warning is issued to inform the user of the use of the unrecorded pack.

In the embodiment of the present invention, when a cleaning pack is loaded, similarly to the case of the unrecorded pack, the magnetic head moves on all of the tracks and performs the work of cleaning the magnetic head. In this case, similarly to the case of the unrecorded pack, a warning to the effect that all of the tracks are moved through (the work of cleaning is completed) is given.

Description will here under be given of the setting of the timer reproduction of an image. The time duration of the timer reproduction of the image is set at eight sec as the basic time duration. This setting of the timer reproduction can be performed such that the timer reproducing time duration can be decreased by one sec by pressing the forward switch 5 several times with the display switch 7 being on, and further, the reproducing time duration of still image can be increased by one sec by pressing the reverse switch 6 predetermined times, with the display switch 7 being on. More specifically, when it is judged that the display switch is on (372) in Step 370, then judgment is made as to whether the forward switch 5 is on or not in Step 374. When it is judged that the forward switch 5 is on (376), judgment is made as to whether the forward switch 5 is turned on anew or remains pressed in Step 378. When it is judged that the forward switch 5 remains pressed (380), the flow returns to the original routine. When it is judged that the forward switch is turned on anew (382) in step 378, then judgment is made as to whether the timer counter is 1, i.e. the reproduction is performed for 1 sec or not in Step 384. When it is judged that the timer counter is 1 (386), then, how many times the forward key 5 may be pressed, the minimum reproducing time duration of 1 sec remains set and the flow is returned to the original routine. Subsequently, when it is 24dged that the timer counter is not 1 (388), 1 sec is subtracted from the timer counter. More specificaly, when the timer duration is 5 sec reproducing time duration for example, if the forward switch 5 is pressed anew, then 1 is subtracted from the timer counter (390). In consequence, the timer duration is 4 sec reproducing time duration. As described above, Every time the forward switch 5 is pressed with the display switch 7 being on, 1 sec is subtracted from the timer counter. When the reproducing time duration becomes 1 sec (386), the reproducing time duration set at 1 sec is repeated as described above.

Subsequently, when the reverse switch 6 is turned on (396) with the display switch 7 being on and the forward switch 5 being not pressed (392) in Step 394, judgment is made as to whether the reverse switch 6 is turned on anew or remains pressed in Step 398. When it is judged that the reverse switch 6 remains pressed (400), the flow is returned to the original routine. Subsequently, when it is judged that the reverse switch 6 is turned on anew (402) in Step 398, judgment is made as to whether the timer counter is 9, i.e. an infinite rest time duration is set or not in Step 404. When it is judged that the infinite rest time duration is set (406) in Step 404, how many times the reverse switch 6 may be pressed, the infinite rest time duration does not change, whereby the key scan scans the original routine. Subesquently, when it is judged that the timer counter is 8 and less in Step 404, such a process is performed in Step 410 that 1 sec after another is added to the timer counter. More specifically, when 5 sec reproducing time duration is set by the timer counter 5 for example, 1 sec is added by pressing the reverse switch 6 one time, whereby the reproducing time duration becomes 6 sec. Furthermore, if the reverse switch 6 is repeatedly pressed and the timer counter becomes 9, the infinite reproducing time duration is set. As described above, in the rotary magnetic recording-reproducing apparatus according to the present invention, when the forward switch 5 is pressed with the display switch 7 being on, the reproducing time duration limited to 1 sec is subtracted, and, when the reverse switch 6 is pressed determined times with the display switch 7 being on, the reproducing time duration can be increased by 1 sec.

Description will hereunder be given of a method of erasing the number display 49. According this method of erasing, the number display is erased by turning on the diaplay switch 7 during display, More specifically, when it is judged that the display switch 7 is turned on anew (414) in Step 412 of FIG. 6C and that this on-operation is done during display of the track number (418) in Step 416, the number display is erased and the non-display mode is set (420). Subsequently, when the switch 7 is turned on anew during the non-display (422), a 2 sec timer is reset (424), the track number is displayed for two sec after the switch is removed from the hand (426), and the display mode is set (428). Furthermore, when it is judged that the display switch 7 is not turned on anew and remains pressed (430), the non-display mode is not set (432) in Step 431, the 2 sec timer is reset (424), the track number is displayed (426) and the display mode is set(428).

Description will hereunder be given of a method of releasing the timer reproduction by use of the rotary magnetic recording-reproducing apparatus according to the present invention. The release of the timer reproduction is carried out by turning on the forward switch 5 or the reverse switch 6 during timer reproduction. More specifically, when the timer reproduction is performed (436) in Step 434 of FIG. 6D, judgment is made as to whether the forward switch 5 or the reverse switch 6 is on or not in Step 438. When it is judged that the forward switch 5 or the reverse switch 6 is not on (440), judgment is made as to whether the timer is zero or not in Step 442. If the timer is zero, then the predetermined timer reproducing time duration is set again (446), and the tracking operation is performed toward the succeeding track (448). When it is judged that the forward switch 5 or the reverse switch 6 is on (450) in Step 438, judgment is made as to whether the forward switch 5 or the reverse switch 6 is turned on anew in Step 460. When it is judged that the forward switch 5 or the reverse switch 6 is not turned on anew (462) in Step 460, the routine is returned to the normal one. When it is judged that the forward switch 5 or the reverse switch 6 is turned on anew (464), the timer reproduction is released (466). In other words, the timer counter is set to 9, stops and is cleared at the same time (468). With this arrangement, a reproduced image is displayed on the indicator 49 for the infinite reproducing time duration. As described above, in the rotary magnetic recording-reproducing apparatus according to the present invention, the timer reproduction can be released by turning on the forward switch 5 or the reverse switch 6 during timer reproduction.

Description will hereunder be ginven of the search mode of the rotary magnetic recording-reproducing apparatus according to the present invention. Firstly, when it is judged that the forward switch 5 or the reverse switch 6 is on (472) in Step 470 of FIG. 6E, then, judgment is made whether the tracking is underway or not in Step 474. When the tracking is underway, the routine is returned to the original one (476), and, when the tracking is not underway, the track number display 49 is erased (478). Subsequently, judgment is made as to whether the forward switch 5 or the reverse switch 6 is turned on anew or not, and, when the forward switch 5 or the reverse switch 6 is turned on anew (482), the tracking operation is performed in Step 484, a 1 sec timer is reset and the routine is returned to the original one, When the forward switch 5 or the reverse switch 6 remains pressed (488) in Step 480, judgment is made as to whether the 1 sec timer is zero or not in Step 490. When the 1 sec timer is not zero (492), the routine is returned to the original one. When it is judged that the 1 sec timer is zero, i.e. the forward switch 5 or the reverse switch 6 remains pressed for 1 sec or more, the 1 sec timer stops in the time counter, simultaneously, the 1 sec timer is cleared (494), and subsequently, the tracking scanning is performed (496). Upon completion of the tracking operation, the track number 49 is displayed for 2 V time duration, i.e. 1/30 sec (498). As described above, in the above embodiment, the screen can be successively fed from one frame to another at high speed by continuously pressing the forward switch 5 or the reverse switch 6, and moreover, the track number 49 can be displayed for 2 V time duration (1/30 sec) during which the screen can be caught by eyesight, so that the necessary screen can be searched.

Step 500 of the time counter-processing, which is used in the above routine includes the 1 sec timer, 2 sec timer, 18 min timer and time setting timer (TIMER).

FIGS. 7A to 7F are the flow charts operationally showing the sub-routine processing in the embodiment of the present invention.

Here, FIGS. 6A to 6E are the flow charts wherein the fact that what interruptions can be applied by the respective keys is explained, mainly taking up the conditions of the respective keys read in by the key scan performed in 1V cycle. However, FIGS. 7A to 7E, which are used for explanation, are the flow charts expaining the functions of the apparatus, mainly taking up the operation of the apparatus, and flags, etc. in the flows are merely used for the convenience's sake.

Description will firstly be given of the routine for searching the first track in the initial operation with reference to 7A to 7E. When the power switch 2 is on or the load switch 120 in on (500), judgment is made as to whether the display switch is on or not in Step 502. When the power source switch 2 or the load switch 120 and the display switch 7 are pressed simultaneously (504), a special mode is set (506) and the number display is indicated as an absolute address (namely, an address is set in accordance with the number of moving distances of the head). When the display switch 7 is not on (508) in the Step 502, a normal mode is set (510), and the number display is indicated as a relative address (namely, only the number of the tracks recorded is counted and this track is addressed). The operation up to this corresponds to the reset of the Step 300 of FIG. 6A. Subsequently, RAM clear is made (512), wherby the memory accumulated so far is cleared. Then, the key scan is made by pulses rotated in 1V cycle (514), and judgment is made as to whether the home position switch 125 is on or not (516). Operations to be described hereunder correspond to the initial tracking operation where the interruption is applied from the Step 352 of FIG. 6B and the operation of sensing the unrecorded pack. When the home position switch 125 is not on (518), the magnetic head 26 is moved by one unit (100 μm) in the reverse direction. This operation is repeated until the home positions witch 125 is turned on. When the home position switch 125 is turned on (524), the magnetic head 26 is moved a predetermined distance in the forward direction (526), the number of head moving distances is counted (528), and judgment is made as to whether the movement of 60 track widths counted from the home position is made or not in Step 530. When the movement of 60 track widths counted from the home position is not made in the Step 530, an A/D value of an wave detection output of an envelope is read (536), and further, judgment is made as to whether the A/D value reaches a predetermined value or more or not in Step 538. When the A/D value is less than the predetermined value (540), which means that the head 26 is not moved to the first recording track, the head 26 is moved in the forward direction again (526), and the abovedescribed operation is repeated until the A/D value reaches the predetermined value or more, i.e. the head 26 reaches the first recording track. When the movement of 60 track widths is made in this operation (532), it is judged that the unrecorded pack is present, this fact is warned, the muting is made and the movement of the head 26 is stopped (534). When it is judged that the A/D value reaches the predetermined value or more in the Step 538, the non-recorded flag is reset and the track number is set to 1 (542). Further, in this No. 1 track, the tracking is performed by the peak searching servo (544), whereby a peak value is sought, and the track number is displayed for two sec (546). As described above, the No. 1 track can be sought in the initial operation.

The foregoing is the explanation of the initial operation.

Description will hereunder be given of the operations of successively searching the tracks of No. 2 and so forth. Further, description will be given of the operation in the case where there are continuously present two or more unrecorded or dropout tracks in the abovementioned search operations with reference to FIGS. 7C to 7D. In the embodiment of the present invention, when there are continuously present two or more unrecorded or dropout tracks, it is judged that all of the further tracks belong to an unrecorded portion, whereby the warning is issued. Firstly, when the search is made from the first track to the second track, judgment is made as to whether the forward switch 5 is on or not in Step 548, and, when it is judged that the forward switch 5 is on, the track number display is turned off (550), and subsequently, judgment is made as to whether the track number display is 50 or more or not in Step 552. When the track number display is less than 50, judgment is made as to whether the number of moving distances of the head, which is counted from the home position is 60 or more or not in Step 554. When the number of moving distances of the head is less than 60, judgment is made as to whether the non-record flag is 1 or not in Step 556. This non-record flag is one showing whether the track subjected to the tracking operation in the above operation is an unrecorded track or a dropout track. When the non-record flag is 1, the track number is not added when the succeeding tracking operation is started, and only the recorded tracks are counted by the non-record flag. Since the non-record flag is set to zero in the Step 542 of the searching operation of No. 1 track, the non-record flag is not 1. In consequence, 1 is added to the track number, further, 1 is added to the number of moving distances of the head, which is counted from the home position (560), the magnetic head 26 is moved by 24 pulse widths (100 μm) in the forward direction (562), and the A/D value of the wave detection output of the envelope is read in (580).

On the other hand, when the forward switch 5 is not pressed (564) in the Step 548, judgment is made as to whether the reverse switch 6 is pressed or not in Step 566. When it is judged that the reverse switch 6 is pressed in Step 566, the track number display switch is turned off (568), and subsequently, judgment is made as to whether the track number is less than 1 or not in Step 570. When the track number is 1 or more, judgment is made as to whether the non-record flag is 1 or not in Step 572. When the non-record flag is zero, 1 is subtracted from the track number display (574), and further, 1 is subtracted from the number of moving distances of the head which is counted from the home position. Subsequently, the magnetic head 26 is moved by 24 pulse widths (100 μm) in the reverse direction (578), and the A/D value of the wave detection output of the envelope is read in (580).

Description will now be given of the case where the forward switch 5 is turned on in order to search from the first track to the second track as described above. Judgment is made as to whether the A/D value is a predetermined value or more or not in Step 582. When the A/D value is the predetermined value or more, the tracking operation is performed by the peak searching servo (584), and further, judgment is made as to whether the forward switch 5 or the reverse switch 6 is pressed in the search mode, i.e. remains pressed for 1 sec or more in Step 586. When no search mode is present, judgment is made as to whether the display mode is present or not in Step 588. When the display mode is present, the track number is displayed for two sec (590). subsequently, the routine is returned to the Step 548 by a skip number ⑪, and the above-described operation is repeated, whereby the magnetic head 26 moves until it reaches 50 tracks, or it moves by 60 track widths counted from the home position switch. Additionally, when it is judged that the search mode is present (592) in Step 586, the magnetic head 26 is moved while the track number is being displayed for 2 V time duration (1/30 sec) (594).

Figure 7B:
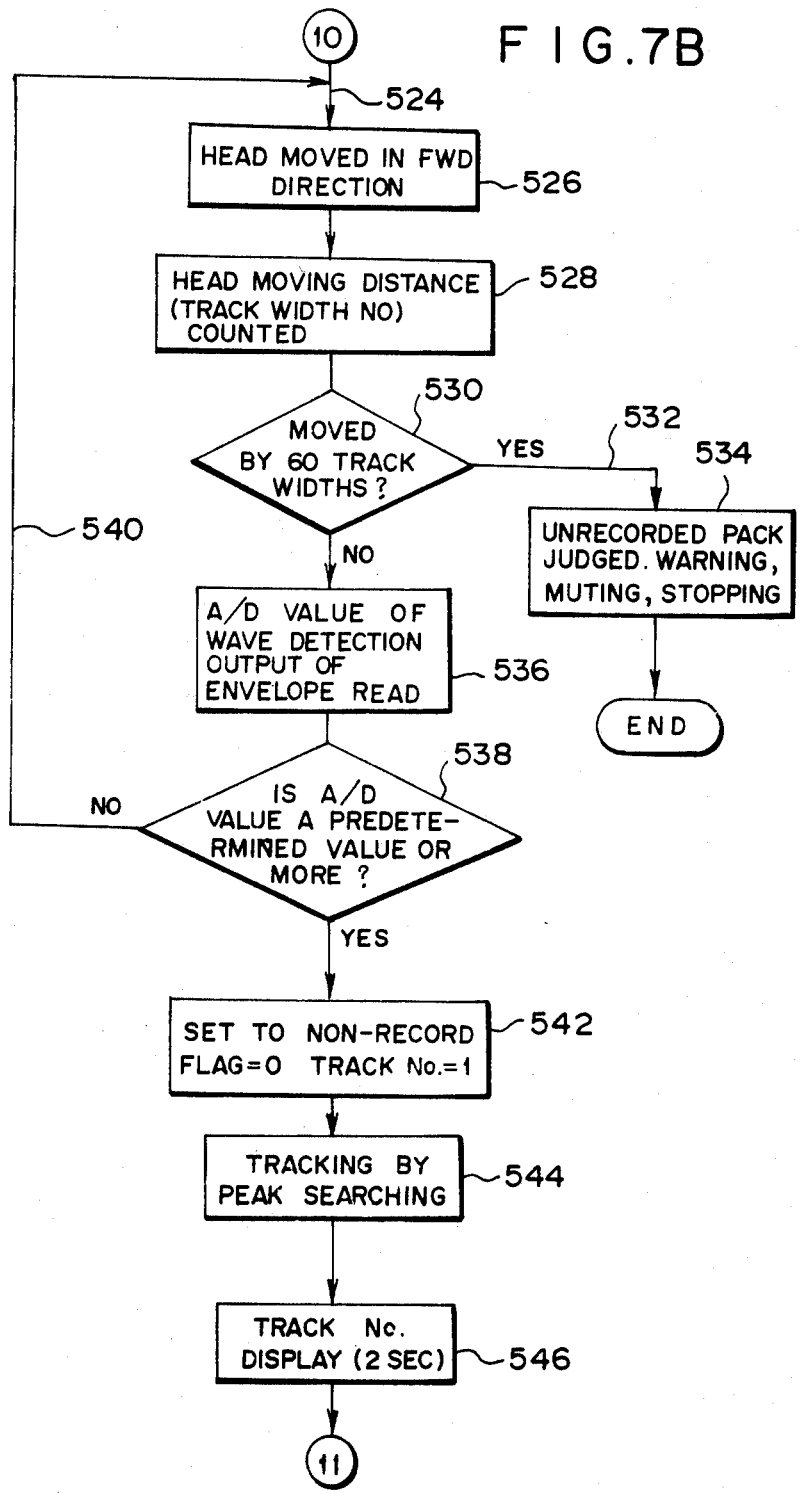
Figure 7C:
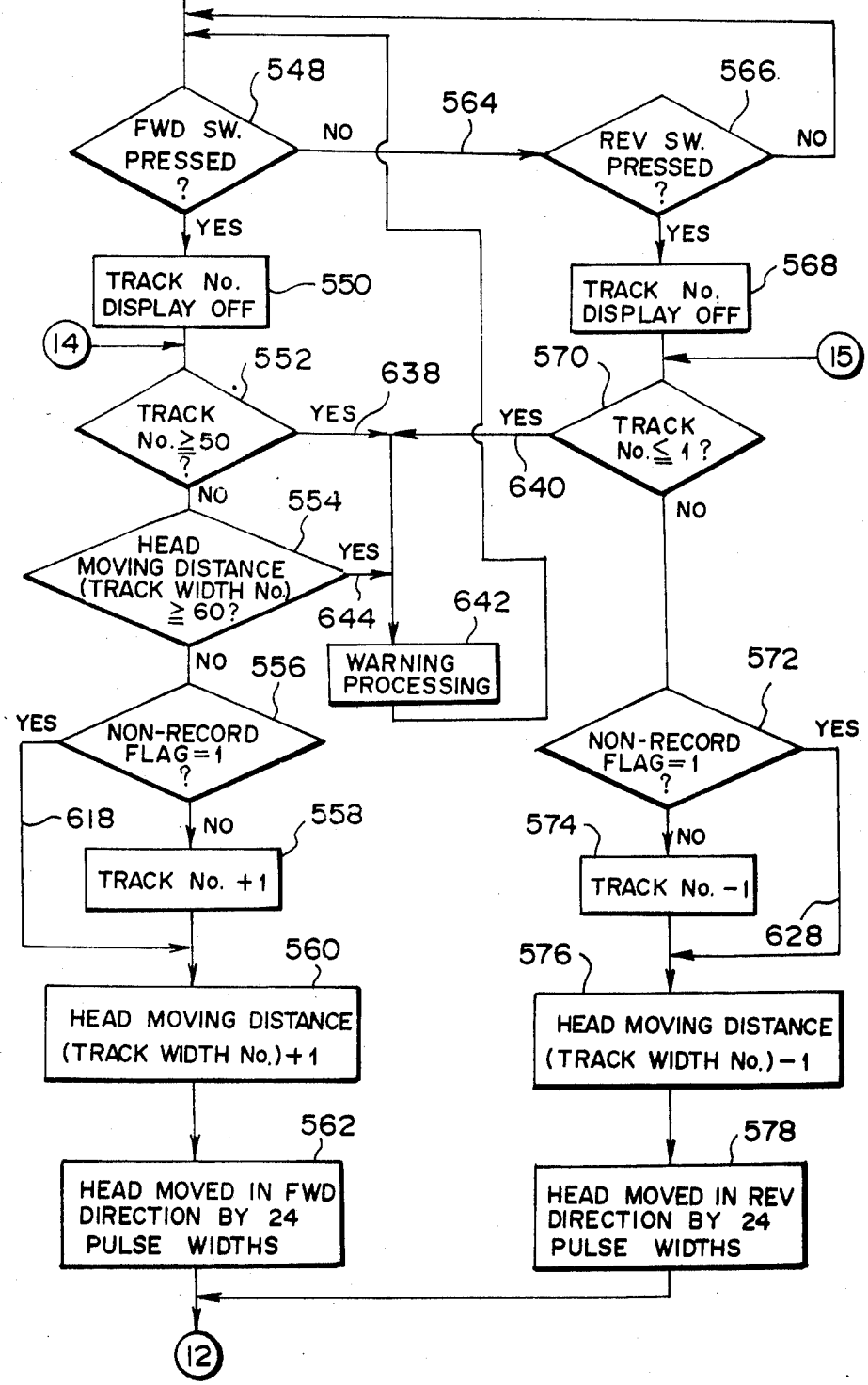
Figure 7D:
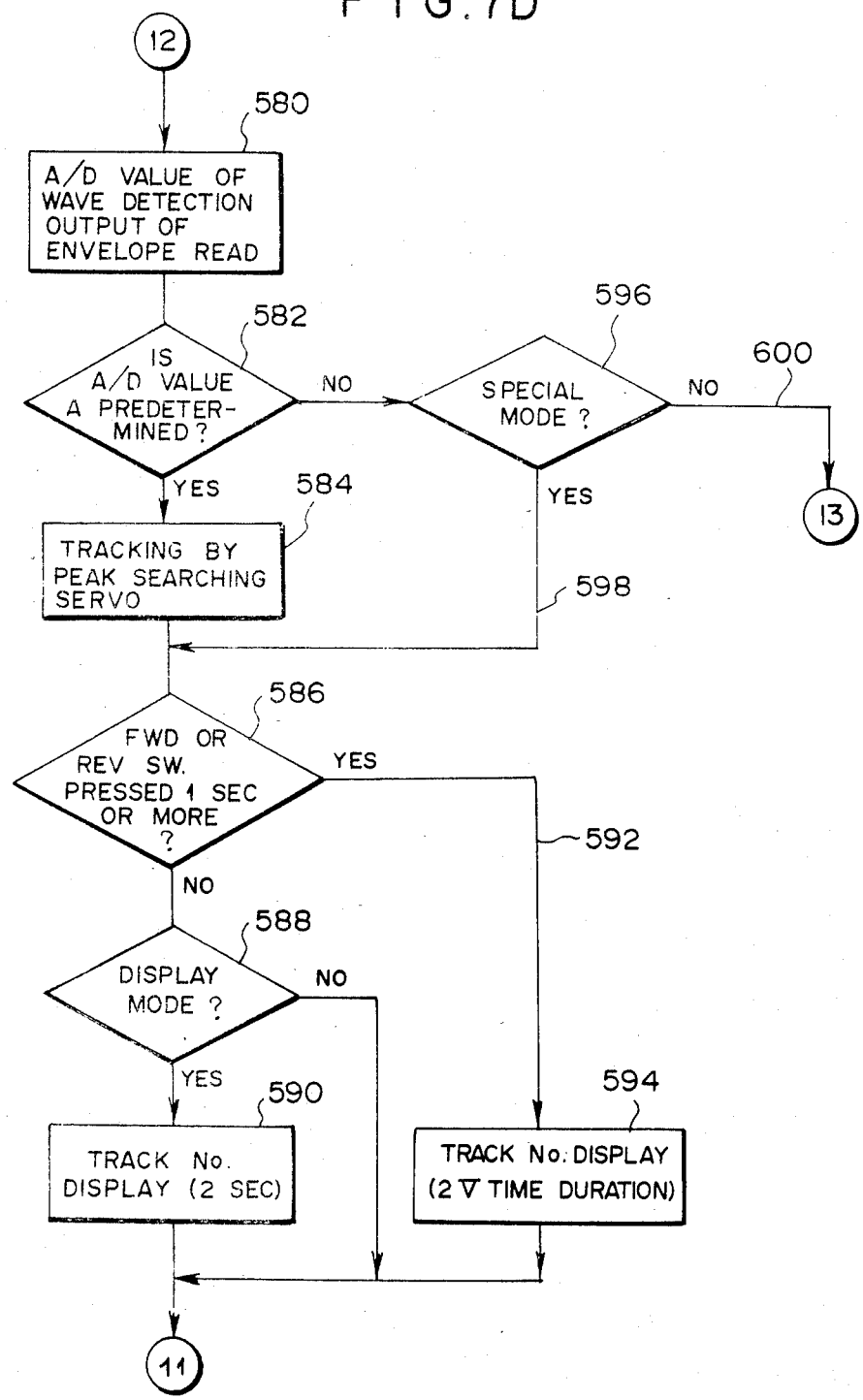
Figure 7E:
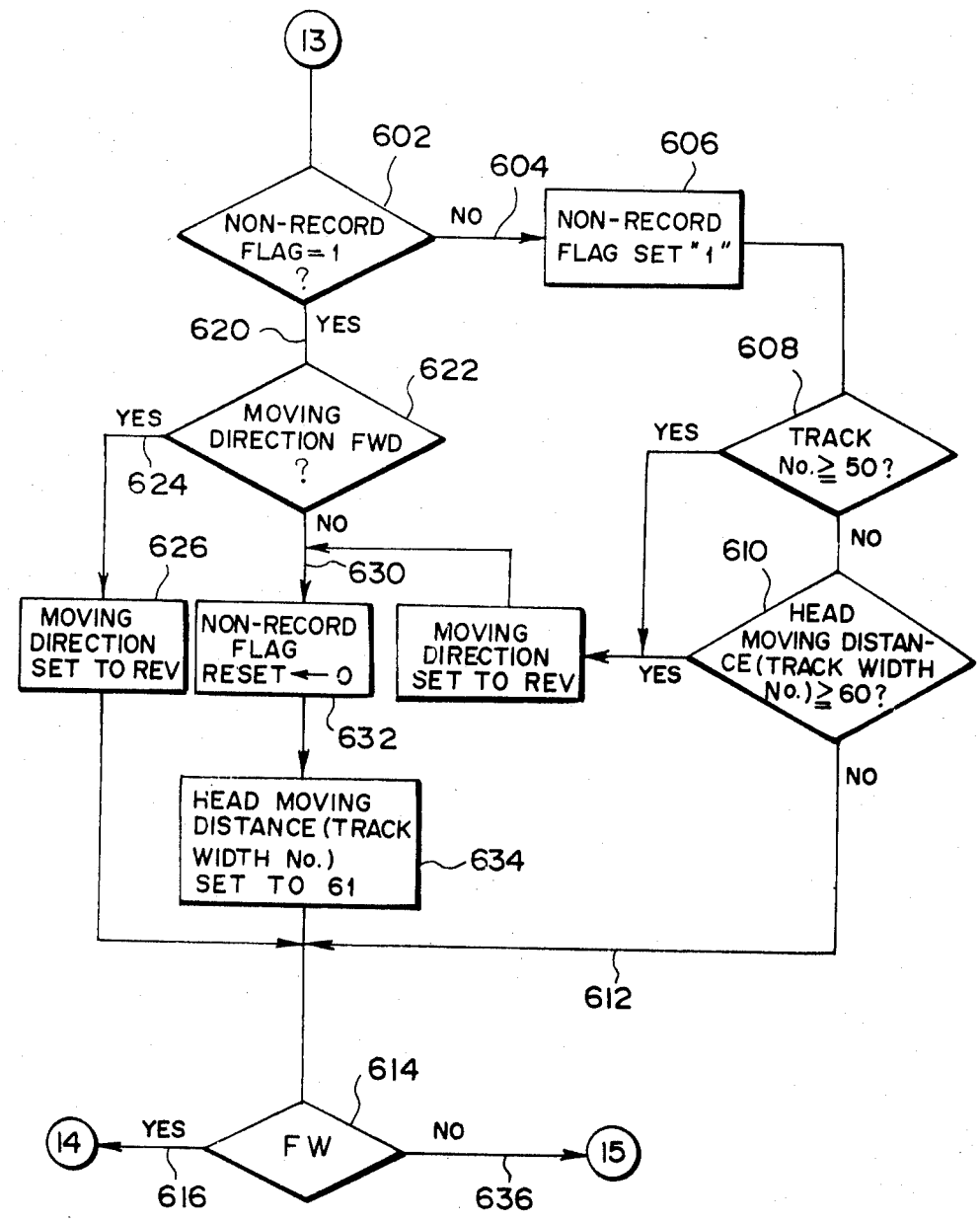

Description will hereunder be given of the case where an unrecorded track is continuously present in the track search after the above-described second track with reference to FIG. 7E. Firstly, when the A/D value is less than the predetermined value, i.e. an unrecorded track is present in Step 582, judgment is made as to whether the special mode is present or not in Step 596, and, when the special mode is present (598), the routine is returned to the original one. When the special mode is not present (600), judgment is made as to whether the non-record flag is 1 or not in Step 602, to which the routine proceeds through a skip number ⑬. Since the non-record flag is set to zero as described above, it is judged that the non-record flag is not zero (604), and then, the non-record flag is set to 1 here (606). Subsequently, judgment is made as to whether the track number is 50 or more or not in Step 608, and, when the track number is less than 50, judgment is made as to whether the number of moving distances of the head, which is counted from the home position, is 60 or more or not in Step 610. When the number of moving distance of the head is less than 60 (612), judgment is made as to whether the forward feed is to be performed or not in Step 614. When it is judged that the forward feed is to be performed (616) in the Step 614, the routine proceeds through a skin number ⑭, and then, judgment is made again as to whether the track number is 50 or more or not in Step 552. When the track number is less than 50 in the Step 552, judgment is made as to whether the number of moving distances of the head is 60 or more in Step 554. When the number of moving distances of the head is less than 60, judgment is made as to whether the non-record flag is 1 or not in Step 556. Since the non-record flag is set to 1 as described above (606), it is judged that the non-record flag is 1 (618) in Step 556, an addition of 1 to the track number display (558) is by-passed, and 1 is added to the number of moving distances of the head (560).

Subsequently, the head 26 is fed by 100 $\mu$m again (562), and the A/D value of the wave detecting output of the envelope is read (580). When the A/D value is the predetermined value or more, it is judged that the unrecorded track is only one, and the tracking operation and the track number display are performed in accordance with the operations of 584 and so forth. Here, when the A/D value is less than the predetermined value (600), the routine proceeds through the skip number 13 , and, judgment is made as to whether the non-record flag is 1 or not in Step 602. Since the non-record flag is set to 1 as described above, it is judged that the non-record flag is set to 1 (620), and then, judgment is made as to whether the moving direction is forward or not in Step 622. Since the moving direction is set to forward, the routine proceeds to a flow 624 and the moving direction is switched from forward to reverse (626). Thereafter, judgment is made as to whether forward or not in Step 614. Since the moving direction is set to reverse (636) as described above, the routine is returned to a skip number (15), and judgment is made as to whether the track number is 1 or not in Step 570. Since the track number is not less than 1, the routine proceeds to Step 572, and judgment is made as to whether the non-record flag is 1 or not. Since the non-record flag is set to 1, a subtraction of 1 from the track number display (574) is by-passed, and then, a substraction of the number of moving distances of the head (576) is made is a flow 628. Subsequently, the head is moved by 100 $\mu$m in the reverse direction f(578), and the A/D value of the wave detection output of the envelope is read ( 580). However, since the magnetic head in this position is located at a first unrecorded track position, the A/D value is not the predetermined value or more, which is judged in Step 582, the routine proceeds through Step 596 and flow 600, further, proceeds through the skip number (13), and again, judgment is made whether the non-record flag is 1 or not in Step 602. Since the non-record flag is 1 (620), subsequently, judgment is made as to whether the moving direction is forward or not in Step 622. Since the moving direction is not forward (630), subsequently, the non-record flag is reset to zero (632), and further, the number of moving distances of the head is set to 61 (634).

When assumptionis made that the record is made up to 30th track with the above-described arrangement, if 31st track and 32nd track are unrecorded tracks, the 31st track is set to the number 61 of moving distances of the head, which is counted from the home position, and the 30th track as being the final recording track is set to the number 60 of moving distances of the head, which is counted from the home position. In consequence, in the control device 60, it is judged that the tracks downward therefrom are out of the recording region. Subsequently, judgment is made as to whether the moving direction is forward or not in Step 614. Since the moving direction is set in the reverse direction (636), the routine proceeds through the skip number (15), subsequently, judgment is made as to whether the track number is less than 1 or not in Step 570. Since the track number is 1 or more, further, judgment is made as to whether the non-record flag is 1 or not in the succeeding Step 572. Since the non-record flag is set to zero (632), 1 is subtracted from the truck number (574), subsequently, 1 is subtracted from the number of moving distances of the head (576), and subsequently, the magnetic head is moved by 100 $\mu$m in the reverse direction (578). Then, the A/D value of the wave detection output of the envelope is read. Since the magnetic head 26 is fed on the two unrecorded tracks in the reverse direction and positioned on the final recording track at this time, it is judged that the A/D value is the predetermined value or more, and again, the peak searching operation (584) and the track number display (590) are repeated in accordance with the tracking opertions from 584 on. Further, when forward switch 5 is pressed in this state, because the number of moving distances of the head is set to 60 as described above, it is judged that the number of moving distances of the head is 60 or more (644) in Step 554, whereby a warning processing is made (642). This warns the fact that, in spite of that the magnetic head 26 is positioned on the final track, the forward switch 5 is pressed. This setting of this final track is stored in the RAM unless the above-described initial operation is performed.

In the above embodiment, when the forward switch 5 is pressed with the track numver being at a position of 50 (548) for example, it is judged that the track number is 50 or more (638) in Step 552, and the warning processing is performed (642). On the contrary, when the reverse switch 6 is pressed in No. 1 track (566), it is not judged that the track number is 1 or more (640) in Step 570, and the warning processing is performed (642) similarly to the above.

The flows explained above correspond to the tracking sub-routines 484 and 496 as shown in FIG. 6E out of the interruption flows in FIGS. 6A to 6E.

It should be understood, however, that there is no invention to limit the intention to the specific forms disclosed, but on the contrary, the invention is to cover all modifications, alternate constructions and equvalents falling within the spirit and scope of the invention as expressed in the appended claim.

What is claimed is:

1. A rotary magnetic recording-reproducing apparatus comprising: a magnetic head for reading signals from a plurality of tracks each of said tracks formed into a locus in which relative positions of a leading end and a tail end of a recording coincide with each other on a rotary magnetic recording medium; head moving means for transferring said magnetic head onto a selected one of the tracks; and control means for controlling said head moving means so that the magnetic head is located on the selected track; and address setting means wherein absolute addresses and relative addresses are simultaneously used to make the addressing from the first track to the final track.

2. A rotary magnetic recording-reproducing apparatus as set forth in claim 1, wherein said absolute addresses are set in association with pulse signals delivered to a motor for driving said magnetic head.

3. A rotary magnetic recording-reproducing apparatus as set forth in claim 1, wherein said relative addresses are set on the basis of the presence of detection of an envelope of a track by said magnetic head.

4. A rotary magnetic recording-reproducing apparatus comprising:

a recording medium having a plurality of recording tracks formed thereon;

a magnetic head for reading signals from said tracks of said recording medium;

positioning means for positioning said magnetic head onto a selected recording track;

computer memory means, said computer memory means having a plurality of memory locations defined therein;

wherein an address is assigned to each of said memory locations; and address setting means for assigning both absolute addresses and relative addresses to said recording tracks so as to define the absolute and relative position of said recording tracks.

5. A rotary magnetic recording-reproducing apparatus as set forth in claim 4, wherein said absolute addresses are set in association with pulse signals delivered to a motor for driving said magnetic head.

6. A rotary magnetic recording-reproducing apparatus as set forth in claim 4, wherein said relative addresses are set on the basis of the presence of detection of an envelope of a track by said magnetic head.

* * * * *